United States Patent [19]

Marcout et al.

[11] Patent Number: 5,421,370

[45] Date of Patent: Jun. 6, 1995

[54] DEVICE FOR SEALINGLY POSITIONING A TUBE USED TO REPAIR A DAMAGED PIPE

[75] Inventors: Alain Marcout, Chaponost; Marcel Teillaud, Neuville-sur-Saone; Yves Berger, Lyons; Michel Berland, Champagne-au-Mont-d'Or, all of France

[73] Assignee: Gaz de France, Paris, France

[21] Appl. No.: 168,201

[22] Filed: Dec. 17, 1993

[30] Foreign Application Priority Data

Dec. 21, 1992 [FR] France .................. 92 15409

[51] Int. Cl.⁶ .............................. F16L 55/18
[52] U.S. Cl. .......................... 138/98; 138/97; 138/109; 138/155
[58] Field of Search ............ 138/103, 97, 98, 120, 138/155, 177, 178, 40, 44, 89, 109; 285/17, 24, 27

[56] References Cited

U.S. PATENT DOCUMENTS

| Re. 30,929 | 5/1982 | Maimets | 138/98 |
| 2,546,337 | 3/1951 | Gibson | 138/155 |
| 4,437,494 | 3/1984 | Soper et al. | 138/97 |
| 4,639,016 | 1/1987 | Rogers et al. | 138/97 |
| 4,840,194 | 6/1989 | Berry | 138/155 |
| 4,976,288 | 12/1990 | Steele et al. | 138/155 |
| 4,986,951 | 1/1991 | Ledoux et al. | 138/97 |
| 4,995,427 | 2/1991 | Berchem | 138/155 |
| 5,052,445 | 10/1991 | Berchem | 138/98 |
| 5,134,251 | 7/1992 | Martin | 138/155 |
| 5,190,705 | 3/1993 | Corazza | 138/97 |
| 5,261,461 | 11/1993 | Smith et al. | 138/98 |
| 5,297,582 | 3/1994 | Kitajima et al. | 138/98 |
| 5,329,063 | 7/1994 | Endoh | 138/98 |

FOREIGN PATENT DOCUMENTS

3722622 10/1988 Germany .
9007672 7/1990 WIPO .

Primary Examiner—James E. Bryant, III
Attorney, Agent, or Firm—Rothwell, Figg, Ernst & Kurz

[57] ABSTRACT

A flange (33) which can be connected to a length of pipe which is to be renewed (1a) and which comprises a series of separable disc-shaped elements individually constituted by a plurality of parts. Sealing-tight gaskets are interposed with a clamping effect between two element parts and between two adjacent disc-shaped elements. By way of a terminal flange element (33e) it is possible also to place at the end of the flange a monitoring device or a counter-flange (77) for guiding a casing pipe (35). The flange may be dismantled when casing is completed.

8 Claims, 5 Drawing Sheets

FIG_13

FIG_14

DEVICE FOR SEALINGLY POSITIONING A TUBE USED TO REPAIR A DAMAGED PIPE

BACKGROUND OF THE INVENTION

1. Field of the Invention

The invention relates to connecting elements provided on pipes and other ducts, for example for the distribution of water or gas.

More precisely, the invention is particularly concerned with proposing a removable sealing-tight flange made in several parts so that it can be mounted on a pipe connecting member, quite particularly within the context of guidance of a relatively flexible tube such as a polyethylene tube used for the interior casing of, in particular, an existing metal piping when it proves faulty, such casing possibly being fitted "under load" (that is to say without interrupting the supply to the user).

2. Description of Related Art

Of course, there are already suitable means of permitting the internal casing of pipes.

At the present time, when for instance localised renovation is required along a cast iron pipe, the current procedure is to dig two pits, upstream and downstream of the faulty portion in order to remove the pipe from the earth at those points. Once the pits are prepared, two branch connections and temporary occlusion systems are put in place, and the pipe is cut at the location of these two pits. Consequently, the part to be cased is defined between the cuts and the gas supply to the users is not interrupted.

In the "upstream" pit (referred to as the entry pit) a monobloc flange fitted with a valve or tap is fitted to the upstream end of the portion to be cased and, by means of an "introducer" (or dolly), the replacement flexible pipe (which of course has a diameter smaller than that of the faulty pipe) is inserted into the cut section. Of course, care will have first been taken to withdraw the temporary occlusion means where necessary.

Once the length of pipe has been cased, a sealing-tight plastic foam is then normally injected around the casing pipe inside the end of the length through which this pipe emerges. The object of the foam is to seal the space between the casing pipe and the cased pipe. Once the foam has set, the operator generally breaks off the end of the portion of pipe situated beyond the block of foam and a fresh foam plug is generally introduced into the end of the metal pipe which is thus prepared, the foam then being normally contained in a bag to form a sealing-tight cone reinforcing the protection provided by the first plug.

As the remaining operations are quite conventional, reference to them will cease at this point. However, it should be noted that the use of such foam plugs does in practice prove to be an operation which is difficult to control, especially for the following reasons;

First of all, the conditions of use depend upon the ambient temperature. In particular, the foam may not be used at temperatures below 5° C.

There are also problems relating to the reliability of the sealing-tightness, taking into account the extent of control of the setting of the products used. For the operations to take place correctly, therefore, it is essential that the personnel should be qualified and well trained.

Furthermore, in spite of the precautions adopted, it is sometimes difficult to control the expansion of the foam inside the pipe, with the inherent risk of the adjacent pipes being occluded.

Moreover, actual operating conditions sometimes result in foaming product being wasted and furthermore, the effective life of the foaming product needs to be monitored.

Finally, it is found that, in the course of time, fluctuations in temperature affect the reliability of the seal, the different nature of the casing pipes (plastics materials) and of the encased pipes (metal, often cast iron or steel) serving only to aggravate this.

To sum up, over and above the question of costs, the existing systems present problems of rational use and viability over the course of time.

SUMMARY OF THE INVENTION

Under these conditions, the object of the invention is to propose a connection, guidance and monitoring system which makes it possible in particular to rationalise the casing operations and to do so with greater viability and better working conditions than those which currently exist.

To be more precise, the invention proposes in particular a sealing-tight flange comprising:

a series of separable disc-shaped flange elements each traversed by a central orifice and disposed one after another, coaxially according to their orifice axis, said elements being individually constituted by a plurality of separable parts connected to one another according to a junction surface essentially parallel with their said common orifice axis;

first annular gaskets interposed successively between two adjacent flange elements;

second gaskets successively interposed portion-wise between two junction surfaces of said flange elements parts;

first removable axial connecting and clamping means for fixing the flange to a connection member mounted on a pipe end and for the sealing-tight joining of different flange elements inter se; and second removable transverse means for clamping inter se various parts of one and the same flange element.

Designed in this way, and over and above the fact that it is "recoverable" once its use is finished, this flange is all the more beneficial since it makes it possible to removably to fit on it, on the side thereof opposite the pipe which carries it, either a device for inspecting the effective casing of the pipe portion which has been renovated, or a counter-flange constructed as at least two separable parts which can easily be fitted around and removed from the casing pipe in order to reinforce the sealing-tightness around it until the casing operation is finally completed.

In addition to a demountable flange, the invention likewise and more generally refers to a guidance device favouring these casing operations, the device comprising the aforesaid flange, the diameter of the flange elements being then greater than the outside diameter of the casing pipe while the diameter of the orifice of the first annular gaskets will be substantially equal to or slightly less than this same piping diameter, the diameter of the last flange element opposite the pipe having on the other hand an orifice diameter which is substantially equal to the outside diameter of the pipe.

In this way, the operators may have available a flange the sealing-tightness of which will be ensured in stages, therefore further reinforcing the security. In addition, within the scope of this application, the casing pipe may be effectively guided especially by the terminal flange element the diameter of which will match it, the transparent device which can be connected to the end of this terminal flange element further reinforcing the security conditions.

Of course, it is obvious that such an assembly will not in practice be very much affected by temperature since, once the casing operations are completed, its removability will make it possible further to reduce the operating costs.

In addition, whatever their degree of training, the operators will not run any risk of blocking up the branch pipes or other associated draw-off connections, since no filling material will be used. Quite simply, therefore, the problems of product wastage will be overcome.

BRIEF DESCRIPTION OF THE DRAWINGS

Further characteristic features and advantages of the invention particularly in connection with the recommended casing process will become further apparent from the more detailed description which follows and in which reference is made to the appended drawings which illustrate a preferred embodiment of the invention and in which.

DETAILED DESCRIPTION OF PREFERRED EMBODIMENTS

With regard to the drawings, the following description relates only to a preferred embodiment and use of the means and method of the invention within the framework of casing a metal pipe, of cast iron for example, in which a gas such as natural gas is circulating.

To begin, let it be assumed that a specialised team has, at some location along this pipe, found a pipe which needs to be renewed.

On either side of this length of pipe, two pits 5a and 5b are then sunk in order to expose two portions of pipe 1b, 1c situated respectively upstream and downstream of the length 1a (the arrow 7 indicates the direction of gas circulation).

Figure 1:
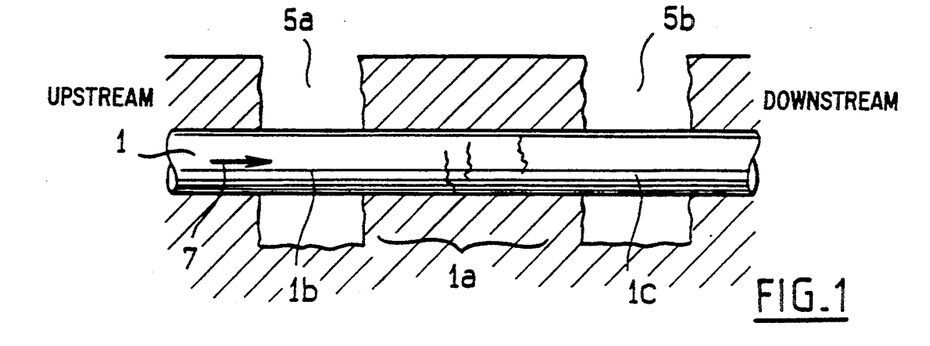
FIGS. 1 to 4 diagrammatically show the first four principal stages of preparation for the casing of a length of pipe which is defective or which is to be renewed.
Figure 2:
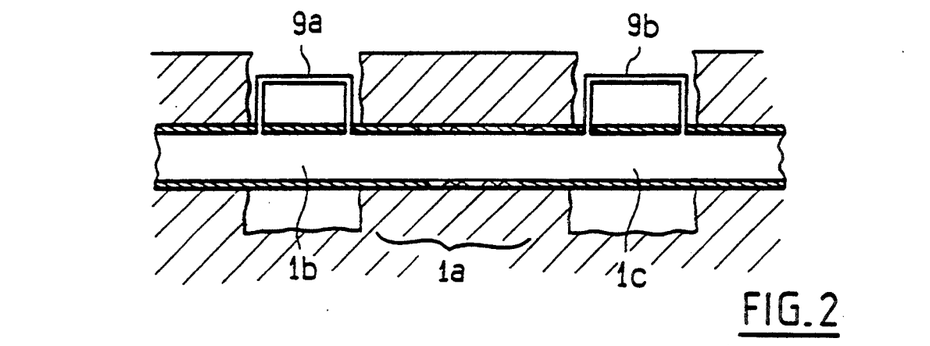

With the conventional precautions on usage, two branch pipes of suitable length, 9a, 9b (FIG. 2) are then connected to the locations of the two exposed portions 1b, 1c.

Once this operation has been carried out, sealing-tight isolating means are placed in position to force the gas to circulate into the branches.

Figure 3:
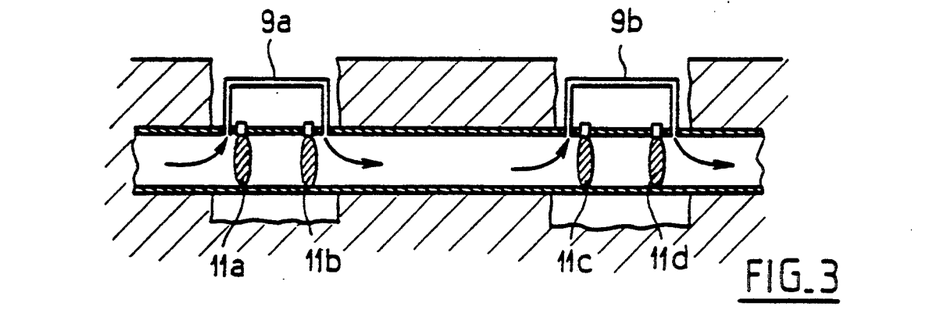

For this purpose, it is possible in particular and in conventional manner to use four inflatable balloons 11a, 11b, 11c, 11d which are introduced into the pipe via four transverse bores (FIG. 3). (All this is completely known since document FR 2 663 104 for instance describes means adapted to perform these operations.)

Figure 4:
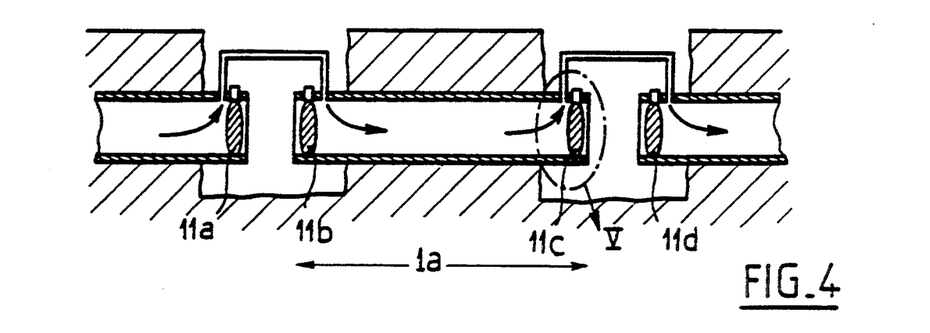

It will then be possible to isolate the pipe length 1a to be renewed by cutting the pipe at the location of the two pits, between the aforesaid sealing-tight isolating means (FIG. 4).

Once these two breaks have been made, the actual casing operations can be started.

In place of installing just non-removable monobloc flanges and ensuring sealing-tightness at the appropriate places by resorting to an expansible plastic foam, as was done hitherto, resulting in the drawbacks described above, the practice now, according to the invention, will be to install at least at the downstream end of the isolated length of pipe 1a a connecting member which may be removed once casing is completed.

Figure 5:
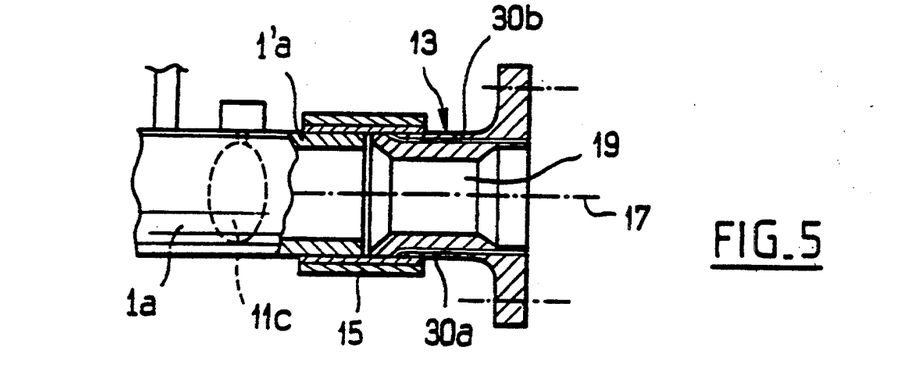
FIG. 5 shows the placing of the flange according to the invention (in this case in two parts) in position on the side of the downstream end of the isolated length of pipe in FIG. 4 (that is to say at the place marked V in this same drawing)

Consequently, FIG. 5 shows a removable connecting member or flange 13 disposed coaxially with the length of pipe 1a to be renewed, and in this case on the side of its downstream end 1'a.

For connecting the parts 1a and 13, it is possible to use a sleeve 15 for the sealing-tight joining of the parts, such as for example a three-piece sleeve of type AP3 manufactured by the companies "E.I.E.", "Electroma" or "Indusha".

Figure 7:
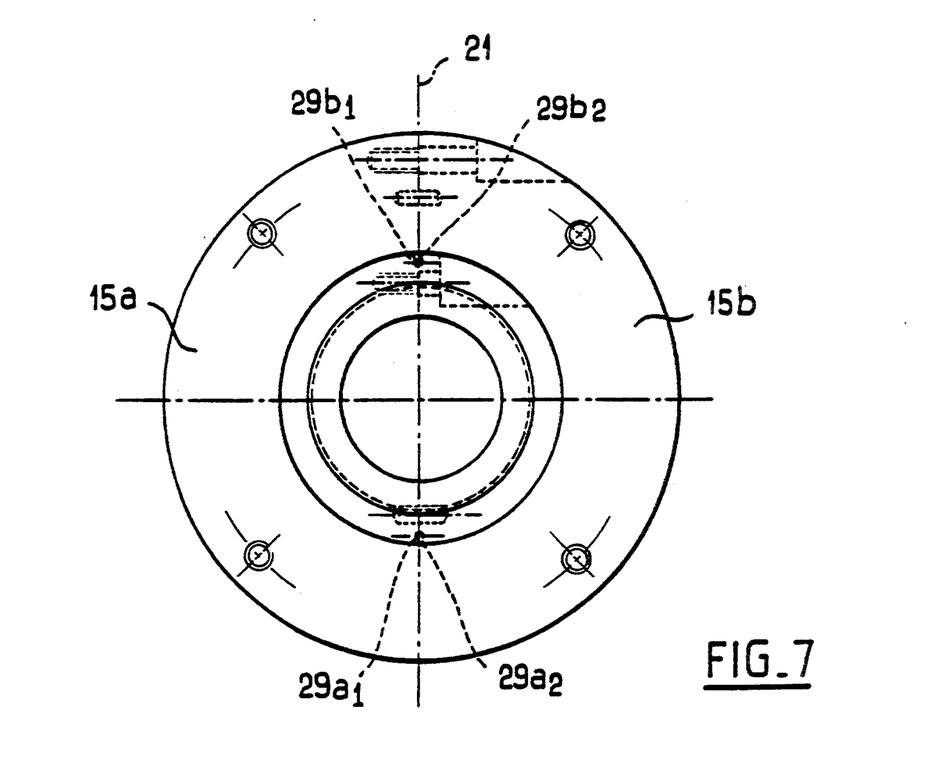
FIG. 7 is a front view of this same flange in the direction indicated by the arrow VII in FIG. 6.

With regard to the connecting member 13, it should be noted that it consists of a plurality of parts which are separable crosswise to the axis 17 in order to be removable even while the flexible inner casing pipe is passing through it. In the illustrated version, this connecting member is in two parts 15a, 15b (FIG. 7). In their assembled state, these parts define the central axial orifice 19 and are connected together according to a junction surface parallel with (or containing) the axis 17. In the embodiment under consideration, this junction surface is constituted by the median plane 21.

Figure 6:
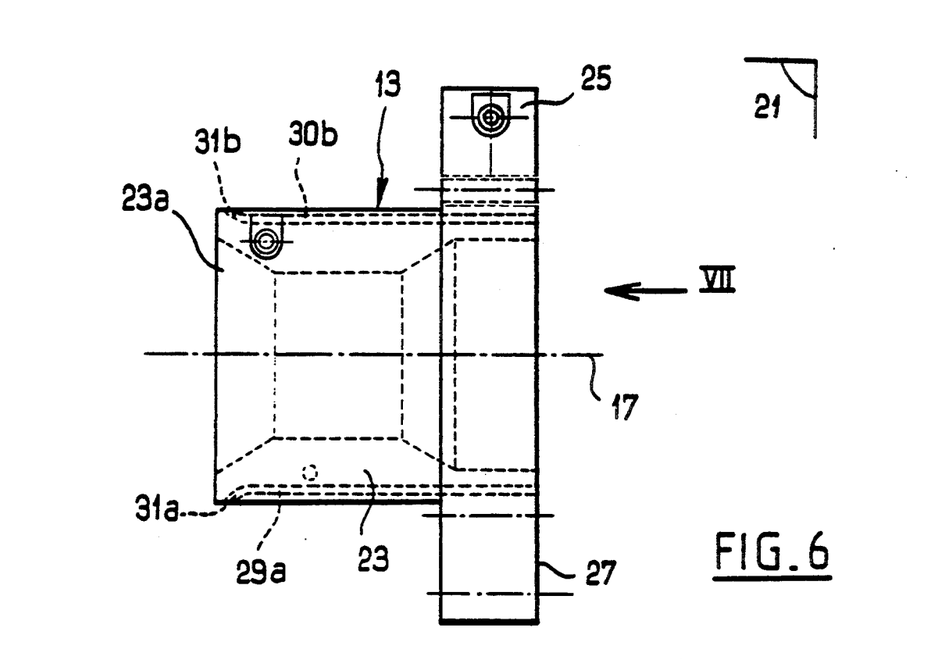
FIG. 6 shows the flange viewed from the side.

As shown more particularly in FIG. 6, the connecting member 13 may consist essentially of a cylindrical body 23 with a circular exterior section having a diameter comparable with that of the carrying pipe, this body 23 extending on the one hand by a part of widened diameter forming a collar 25 on the plane of the gasket 27. In conventional manner, centering lugs and screws ensure the connection of the two half-shells 15a, 15b to each other. To avoid any problem of sealing-tightness, two matching (half) grooves 29a1, 29a2; 29b1, 29b2 are formed at the location of the planes of junction of the two parts in order to be able to receive two sealing-tight gaskets 30a, 30b. In FIG. 6, it will be noted that each of the aforesaid grooves is so formed that once they are joined they form two channels (such as 29a) to accommodate gaskets (such as 30b) which extend over the major part of their length parallel with the axis 17 except in the vicinity of the free end 23a of the body 23 where the grooves have a bend 31a, 31b which directs them towards the outer lateral surface of the body. In other words, the grooves do not open out onto the end wall 23a, so as to avoid any risk of gas leaking into the grooves along the gaskets.

Figure 8:
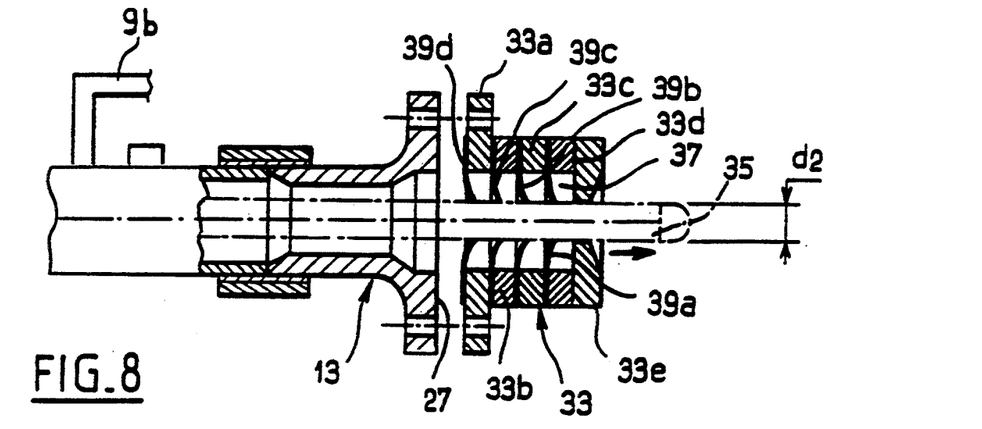
FIG. 8 shows the placing against this flange of another multi-element flange, in accordance with a diagrammatic view which is in median longitudinal section.
Figure 9:
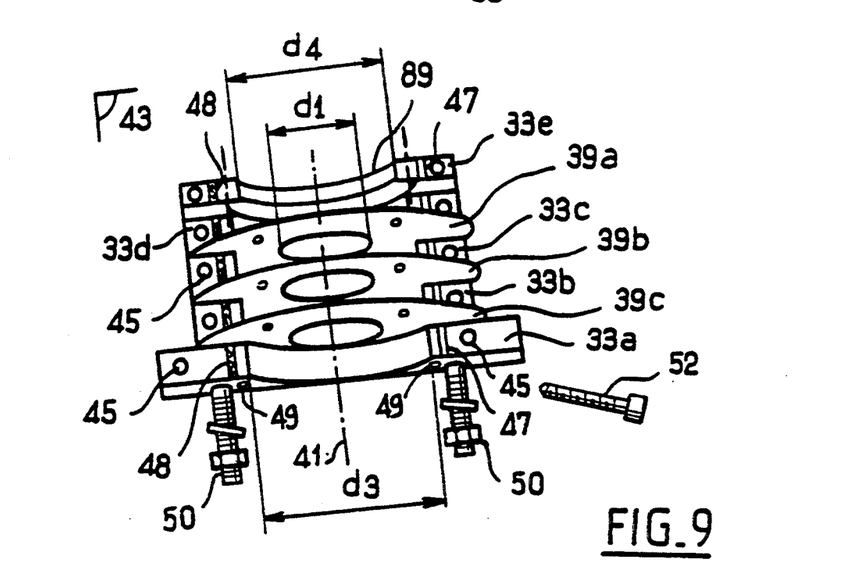
FIG. 9 shows a perspective view of a half of the multi-element flange in FIG. 8, with its annular sealing-tight gaskets in position.

In practice, the connecting member 13 which is thus constituted will in particular be used for the removable fixing of the separable multi-element flange 33 according to the invention, which is shown in particular in FIGS. 8 and 9.

In the illustrated version, this flange 33 is in the form of a series of flange elements 33a, 33b, 33c, 33d, 33e constituting a series of rings, as if the flange had been cut into washers, with a primary disc 33a of greater outside diameter and then four discs having outside diameters substantially equal to one another but less than that of the first disc 33a, which is designed to come axially into contact with the junction surface 27 of the connecting member 13.

In view of the fact that the flange 33 is quite particularly designed to ensure longitudinal sealing-tight guidance of a flexible casing pipe (of polyethylene for example) shown diagrammatically by dash-dotted lines 35 in FIG. 8, it will therefore be traversed in its assembled state by an axial passage generally designated 37. Furthermore, for sealing-tightness, a series of discs (actually four discs 39a, 39b, 39c, 39d) will be interposed between two adjacent flange elements (except for the last two 33d, 33e) and also between the first flange element 33a and the connecting member 13. Advantageously, the common inside diameter D1 of the central orifice of these sealing-tight discs will be the same or even slightly less than the outside diameter D2 of the casing pipe 35. On the other hand, the inside diameter D3 of the flange elements 33a, 33d will preferably be markedly greater than the diameter D2, the pipe being in fact essentially guided in its axial translatory movement by the central orifice of each sealing-tight disc and by the central orifice of the terminal flange element 33e the inside diameter D4 of which will advantageously be substantially equal to the diameter D2, It will thus be understood that, during the course of casing, the aforesaid sealing-tight discs which will be made from a flexible material will become elastically deformed to constitute a kind of central cone around the pipe so favouring sealing-tightness around it.

In addition to the fact of being thus constituted by a series of washers, the flange 33 is such that each washer is formed by two separable parts adapted to be connected according to a median joint plane 43 coincident with the central axis 41 of the flange (FIG. 9). Thus, each flange element may be constituted by two identical and semi-cylindrical parts, transverse bores, some of which are shown at 45 in FIG. 9 making it possible to place in position screws for clamping the two half parts of each element to each other. It must be obvious that for reasons of efficiency the sealing-tight discs 39a will on the other hand be constructed in a single piece.

To deal with the problem of the sealing-tightness of the junction between the parts of each flange element, the solution adopted was, as in the case of the connecting member 13, to construct in the sealing plane surface of each half-element grooves such as are shown in some cases at 47 in FIG. 9, which extend parallel with the axis 41, one after another, so that once the flange has been fully fitted, sealing-tightness in the plane of connection being ensured by portions of gasket or rods 48 housed in the grooves 47, each portion of gasket being separated from the adjacent portion of the elements by discs 39a, 39b . . . .

Figure 12:
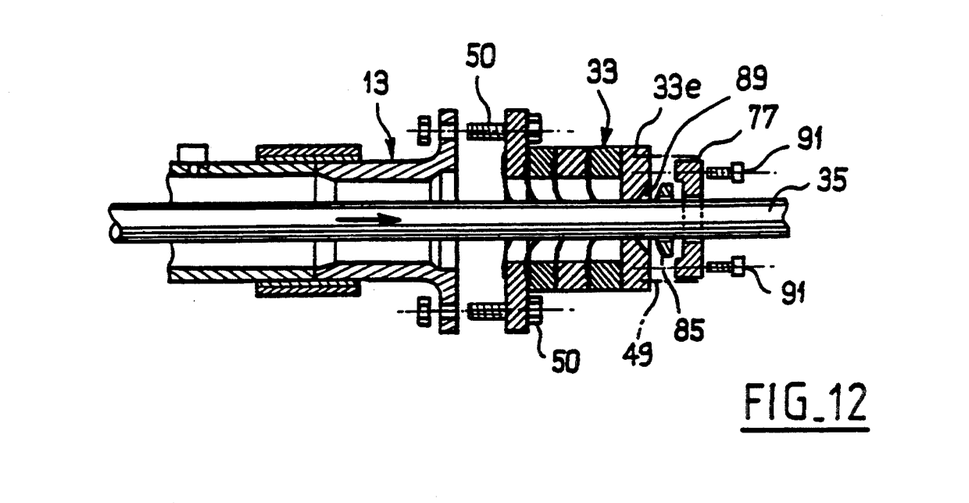
FIG. 12 shows in the same view as in FIGS. 8 and 10, the installation against the aforesaid terminal flange element of a counter-flange which replaces the device.

It will further be seen from FIG. 9 that reference numeral 49 denotes some of the screws provided to traverse and join axially the various flange elements to one another through the gaskets 39a. Clamping screws 52, via the bores 45 of the two half-flanges clamp the hale-flanges of a respective flange element together. In FIGS. 9 and 12, reference numeral 50 is used to denote two screws for clamping the flange against the connecting member 13.

Figure 14:
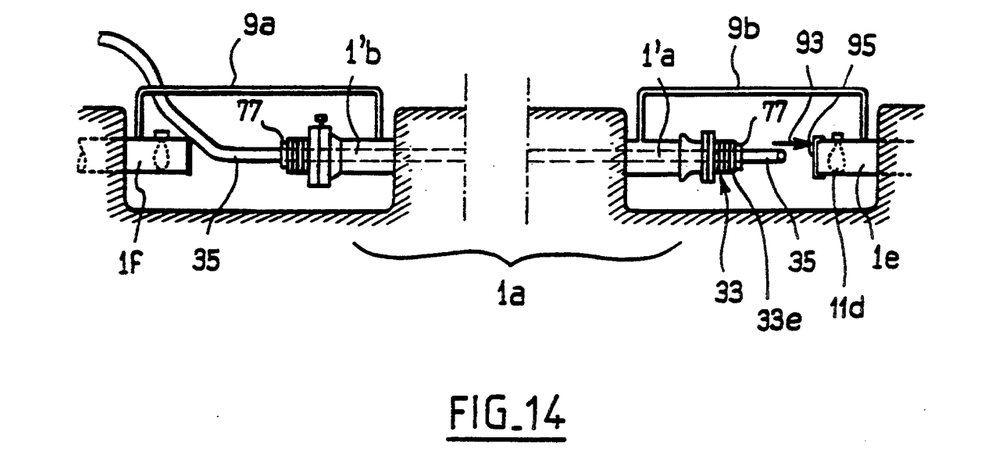
FIG. 14 again shows, in the same image as FIGS. 1 to 4, an overall view of the casing zone when the faulty length is already cased.

As illustrated in FIG. 14, the removable multi-element flange 33 will be installed facing at least the downstream end 1'a of the portion of pipe to be renewed.

Figure 10:
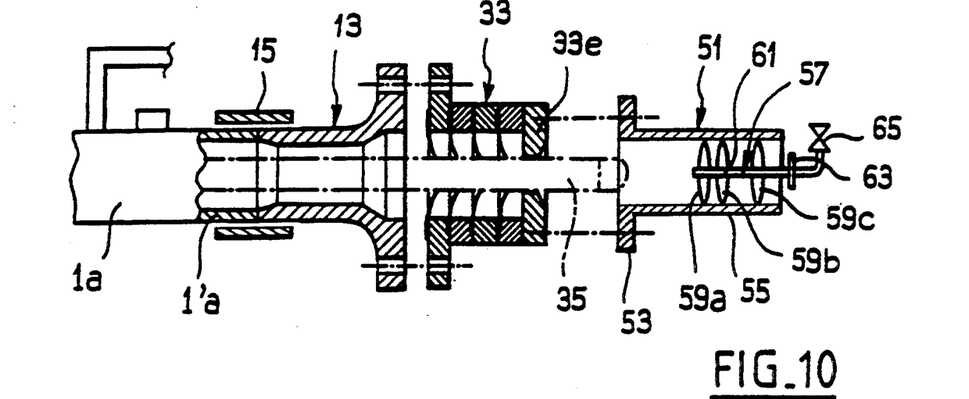
FIG. 10 shows an exploded and longitudinal median sectional view of the positioning of the sealing-tight device.

Once this flange is installed, it is possible to attach to it firstly and in the extension of its terminal flange element 33e on the downstream side, a preferably transparent leaktight chamber or device 51 in FIG. 10. The essential purpose of this device will be to advise the operator that the inner casing pipe has correctly traversed the portion of pipe 1a in the downstream flange 33.

The device 51 may comprise a fixing collar 53 extended axially by a part in the form of a transparent cylindrical tube of circular cross-section 55. Preferably, the device will be open at its two axial and opposite ends. Through the free end opposite the collar 53, a sealing-tight member 57 will be introduced into the interior of the device. This plug 57 may, in the manner of a piston, have three successive guiding and sealing-tight discs 59a, 59b, 59c, mounted on a central tube 61 which can be connected externally to a connecting take-off 53 and to a pressure gauge 65 which makes it possible therefore to monitor the atmosphere and the pressure prevailing inside the device, in fact when the casing pipe 35 discharges into it (FIG. 10).

Figure 11:
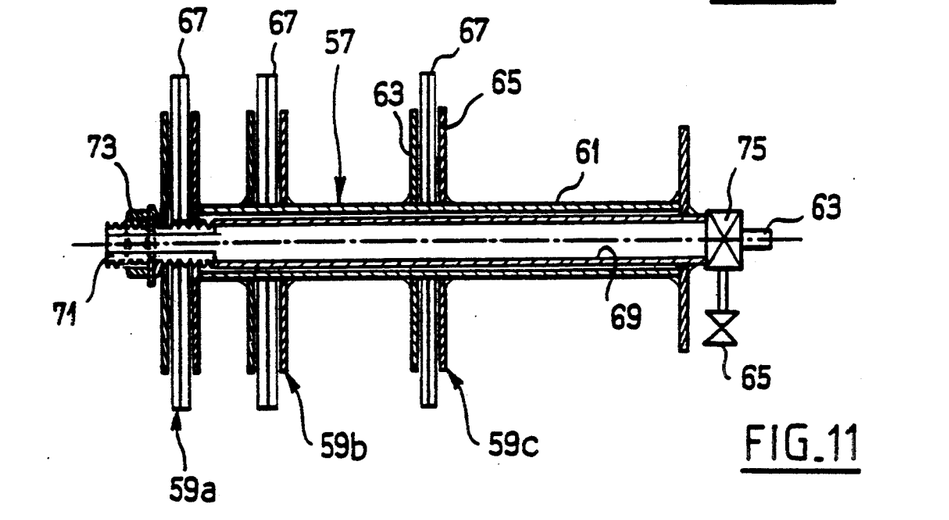
FIG. 11 shows, still in median longitudinal section, the interior part which forms a sealing-tight piston for the device.

FIG. 11 shows an enlarged view of a possible embodiment of the plug 57. Thus, it will be noted that the three radial parts 59a, 59b, 59c may each consist of two radial webs 63, 65 which are locked longitudinally at three different locations along the axial supporting piping 61, each pair of webs clamping a radial sealing-tight pad 67 having an outside diameter preferably slightly greater than the inside diameter of the device. On the inside, the piping 61 may furthermore be traversed by a tube 69 and be finished at one end by a screw thread 71, a nut 73 clamping the first pair of webs against the end of the pipe. At the opposite end, the tube 69 will be connected to the sensor 65 and to the connection 63 via the valve 75.

Once the operator, via the inspection device, has checked the casing pipe 35 and seen that the sensor 65 has not detected any leakage, it can then withdraw the inspection device and replace it, against the terminal flange element 33e, with a counter-flange identified in FIG. 12 by reference numeral 77.

Figure 13:
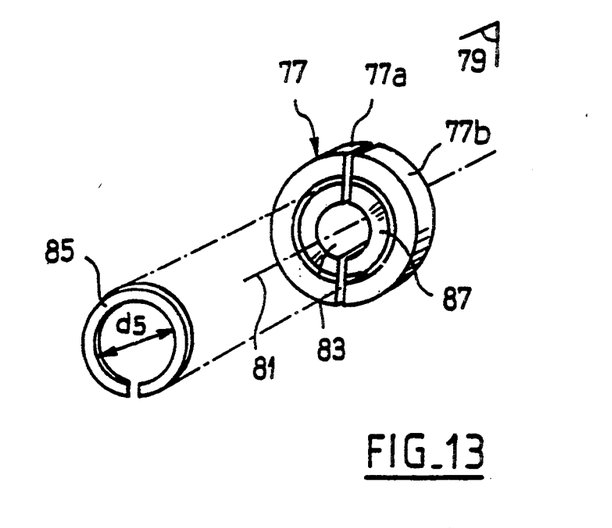
FIG. 13 shows an exploded perspective view of this counter-flange.

As in the case of the other parts 13 and 33, the counter-flange 77 will advantageously be constructed in two half-parts 77a, 77b (FIG. 13) connected by centring lugs according to a median joint plane 79 parallel with the axis 81 of the central orifice 83.

So that once in position against the flange element 33e, the counter-flange 77 is able fully to fulfil its role, the diameter of its central orifice 83 will be chosen to be substantially equal to the outside diameter D2 of the casing pipe 35, in the same way as for the inside diameter D5 of the split sealing ring 85 provided to be positioned in the annular clearance 87 in the counter-flange. In practice, the split seal 85 will however have a thickness greater than the depth of the clearance 87 and may in particular consist of a rubber gasket of the "express" type adapted to penetrate a chamfer 89 provided in the frontal outer surface of the element 33e (see FIG. 12). Of course, clamping means such as 91 may compress the gasket 85 between the groove 89 and the counter-flange 77.

FIG. 14 shows the zone of intervention of this moment while the downstream end of the flexible pipe greatly exceeds the counter-flange 77. All that remains is to withdraw the isolating closure plate 95 which was previously occluding the entrance to the pipe portion 1e and then to connect the pipe to this portion and deflate the sealing-tight balloon 11d.

These final stages of positioning the two opposite ends of the tube 35 respectively in the intact duct parts, 1e on the downstream side and 1f on the upstream side, do not fall within the scope of the invention and they will not be described in greater detail hereinafter, it being simply noted that at the end of the operation, the sealing-tight installation of the tube 35 will be such that the gas emanating from the pipe 1c will circulate inside the tube as far as the pipe 1e, the branch pipes 9a, 9b then no longer playing any part which means that they can be withdrawn as may also the sealing-tight balloons which are still in place.

At this moment, and before the pits are filled in, the operator should recover the flanges 33, separating them into their various elements, with only the annular axial sealing-tight discs 39a, 39b remaining around the pipe 35. The operator may then likewise recover the connecting members 13 in the same way, together with the connecting sleeves 15.

We claim:

1. A sealing-tight device for use in repairing damaged pipes, the device comprising:
   a flange including a series of separable disc-shaped flange elements, each of said flange elements being traversed by a central orifice, said flange elements being disposed one after another coaxially according to their orifice axis, and each of said flange elements including a plurality of separable parts connected to one another along a junction surface of each said separable part, which junction surface is essentially parallel with a common orifice axis of said disc-shaped flange elements;
   a plurality of successive first annular gaskets each of which is disposed between two adjacent disc-shaped flange elements;
   a plurality of second gaskets disposed between the junction surfaces of the separable parts of each of said disc-shaped flange elements;
   removable axial connecting and clamping means for fixing the flange to a connection member mounted on a pipe and for sealing-tight joining of adjacent disc-shaped flange elements; and
   removable transverse connecting means for clamping together the separable parts of at least one of said disc-shaped flange elements.

2. A device according to claim 1, comprising at one end, among said series of disc-shaped flange elements, a terminal flange element wherein the diameter of the central orifice of said terminal flange element is less than the diameter of the orifices of the other disc-shaped flange elements but is substantially equal to or slightly greater than the diameter of the orifice of said annular gaskets successively interposed between said adjacent disc-shaped flange elements.

3. A device according to claim 2, further comprising a supplementary flange element separable from the other disc-shaped flange elements and including a counter-flange traversed by a central orifice the diameter of which is substantially identical to the diameter of the orifice of said terminal flange element, said counter-flange have a plurality of separable parts which are connected to each other along a junction surface that is substantially parallel with said orifice axis;
   a split sealing ring interposed between the terminal flange element and said counter-flange; and
   removable means for axially clamping the counter-flange against the terminal flange element.

4. A device according to claim 3, wherein the terminal flange element has an annular chamber penetrated by said split sealing ring under the clamping pressure of the counter-flange.

5. A device for the sealing-tight guidance of a tube having a substantially circular outer cross-section and used as an internal casing of a damaged pipe which is to be repaired, the pipe having an inside diameter which is larger than the outside diameter of the tube, said device comprising:
   a flange including a series of separable disc-shaped flange elements each traversed by a central orifice and disposed one after another, coaxially according to their orifice axis, said disc-shaped flange elements each including a plurality of separable parts connected to one another along a junction surface of each said separable part, which junction surface is essentially parallel with a common orifice axis of said disc-shaped flange elements;
   a plurality of first annular gaskets interposed successively between two adjacent disc-shaped flange elements;
   a plurality of second gaskets successively interposed between the junction surfaces of the separable parts of each of said disc-shaped flange elements;
   first removable axial fixing and clamping means for fixing the flange to a connection member mounted on a pipe and for sealing-tight clamping of different disc-shaped flange elements; and
   second removable transverse means for clamping therebetween the separable parts of at least one disc-shaped flange element;
   wherein the inside diameter of said disc-shaped flange elements is greater than the outside diameter of the tube to be guided therein, while the diameter of the orifice in each of said plurality of first annular gaskets is not greater than the outside diameter of the tube, and wherein a flange element located at an end of said series of disc-shaped flange elements opposite the pipe connection member to which said flange is fixed has an orifice diameter substantially equal to the outside diameter of the tube.

6. A device according to claim 5, wherein the pipe-connecting member to which said series of disc-shaped flange elements is removably fixed is a connecting flange with a central orifice passing therethrough, said connecting flange comprising at least two separable parts connected to each other along a junction surface of each said separable part which junction surface is substantially parallel with an orifice axis of the connecting flange, said connecting flange separable parts having sealing-tight gaskets extending therebetween and substantially parallel with the orifice axis of the connecting flanges, wherein at an end of the connecting flange disposed adjacent the pipe said sealing-tight gaskets diverge outwardly away from the orifice axis of said connecting flange.

7. A device for the sealing-tight guidance of a tube adapted to be used as the internal casing of a damaged pipe to be repaired, the inside diameter of the pipe being greater than the outer diameter of said tube, said device comprising:

a flange including a series of separable disc-shaped flange elements each traversed by a central orifice and disposed one after another, coaxially according to an orifice axis of the disc-shaped flange elements, said disc-shaped flange elements being individually formed by a plurality of separable parts connected to one another along a junction surface of said separable parts which is essentially parallel with a common orifice axis of said disc-shaped flange elements;

first annular gaskets interposed successively between two adjacent disc-shaped flange elements;

second gaskets successively interposed portionwise between the junction surfaces of the separable parts of said disc-shaped flange elements;

first removable axial connecting and clamping means for connecting the flange to a connection member mounted on an end of the pipe and for joining different disc-shaped flange elements;

second removable transverse means for clamping together the separable parts of at least one of said disc-shaped flange elements;

said series of disc-shaped flange elements comprising at one end a terminal flange element, the diameter of the central orifice of said terminal flange element being less than that of the orifices of the other disc-shaped flange elements but being substantially equal to or slightly greater than that of the orifice of said annular gaskets interposed between two adjacent disc-shaped flange elements; and a transparent hollow device occluded by a plug and having an internal cross-section at least equal to the diameter of the orifice of the terminal flange element, said hollow device being fixed to the terminal flange element in a removable manner.

8. A device according to claim 7, wherein the plug for closing the hollow device comprises at least one sealing-tight disc having a central axis and being disposed in the hollow device so as to extend perpendicularly to the axis of the hollow device, said sealing-tight disc being traversed by a tube opening on the outside of the device, said tube being equipped with a tap and a connecting member for attachment to a pressure gauge.

* * * * *

UNITED STATES PATENT AND TRADEMARK OFFICE
CERTIFICATE OF CORRECTION

PATENT NO. : 5,421,370
DATED : June 6, 1995
INVENTOR(S) : Alain MARCOUT, et al.

It is certified that error appears in the above-identified patent and that said Letters Patent is hereby corrected as shown below:

ON THE COVER PAGE

[75] <u>Inventors</u>:
        line 3, "Lyons" should read --Lyon--.

COLUMN 1

Line 57, ";" should read --.--.

COLUMN 2

Line 48, delete "to" (second occurrence).

COLUMN 6

Line 13, "hale-flanges" should read --half-flanges--

COLUMN 9

Line 5, "flanges" should read --flange--.

Signed and Sealed this

Fifth Day of December, 1995

Attest:

BRUCE LEHMAN

*Attesting Officer*    *Commissioner of Patents and Trademarks*